UNITED STATES PATENT OFFICE.

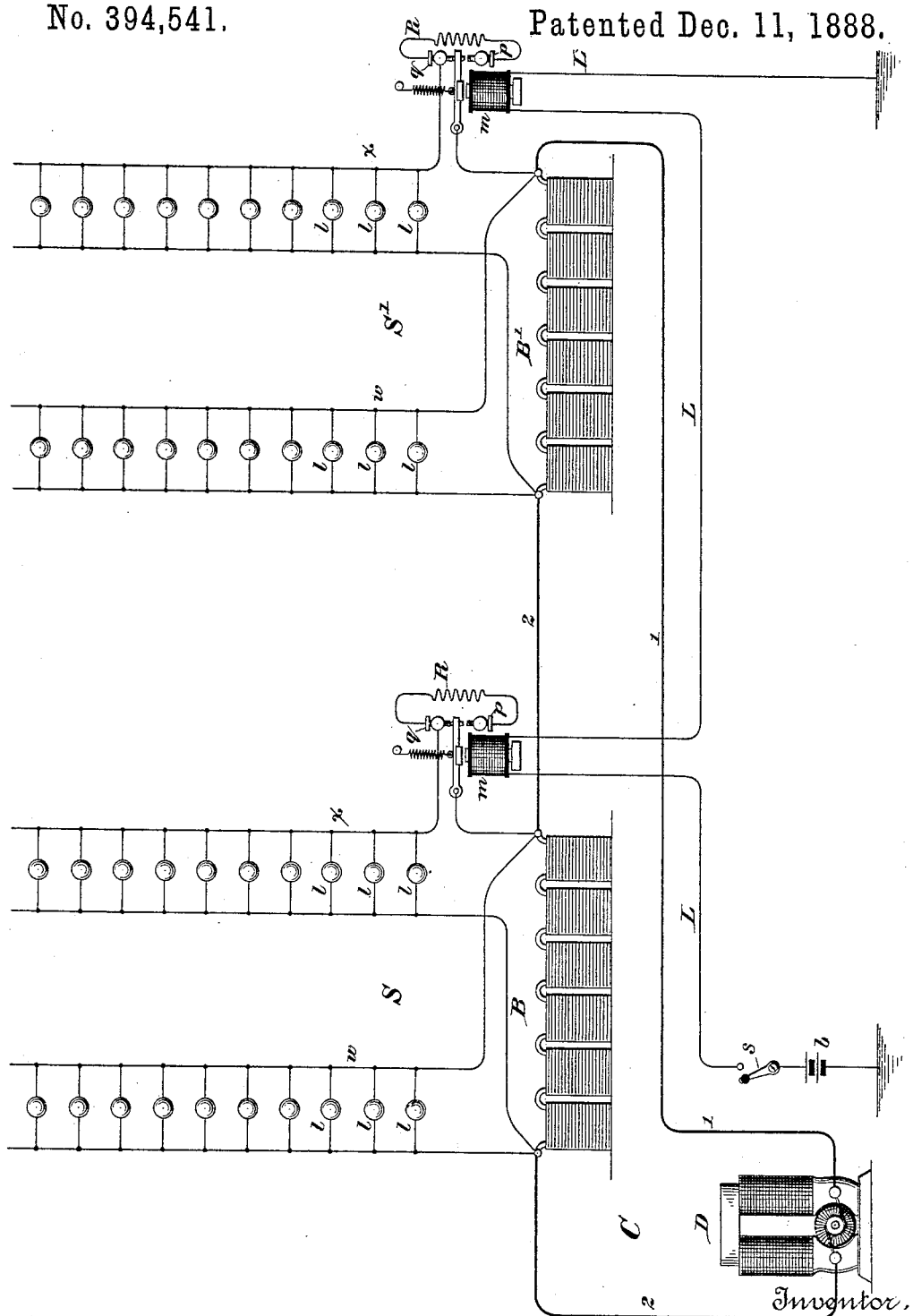

ZACH LATSHAW, OF McKEESPORT, PENNSYLVANIA.

ELECTRIC DISTRIBUTION BY SECONDARY BATTERIES.

SPECIFICATION forming part of Letters Patent No. 394,541, dated December 11, 1888.

Application filed June 27, 1888. Serial No. 278,371. (No model.)

*To all whom it may concern:*

Be it known that I, ZACH LATSHAW, a citizen of the United States, and a resident of McKeesport, in the county of Allegheny and State of Pennsylvania, have invented certain new and useful Improvements in Distribution by Secondary Batteries, of which the following is a specification.

My invention is an improvement in the distribution of electricity by secondary batteries or accumulators. It relates to that form of central-station accumulator-plant in which the maximum current is furnished jointly by the secondary batteries and dynamo, the dynamo being operated during the periods of minimum consumption to charge the batteries. In this arrangement it sometimes happens during the period of maximum consumption, when the greatest load is on the batteries at the sub-stations, and both dynamo and batteries are contributing to the current-supply, that the dynamo-current will fail or be cut off by breakage of the charging-circuit, or by other cause, and in this event a load is thrown upon the battery in amount much beyond its capacity. The increased rate of discharge ensuing greatly injures the battery, and it is to avoid this injury that my improved arrangement has been devised.

My improvement consists in the arrangement of apparatus and circuits, as follows: At each sub-station where there is located a series of cells I divide the working-circuit into two sections, one of which contains the translating devices designed to be supplied by the battery at its normal rate of discharge, and the second section contains that portion which it is expected will be fed by the dynamo. In the main lead of this second section I place an electro-magnetic circuit-changer, which is to be operated by a separate and independent circuit from the central station, so that when the dynamo fails for any reason to contribute its share to the maximum consumption the attendant at the central station can, by closing the special switch-controlling circuit, break the working-circuit and insert an artificial resistance in the said working-circuit, thus preventing injury to the battery. The temporary break causes a momentary failure of the light, and this is immediately followed by a return of the light operated below its normal candle-power—an effect due to the insertion of the artificial resistance—and this acts as a predetermined signal to inform the sub-station of the temporary stoppage while only partially depriving said station of light.

The accompanying drawing illustrates my invention.

C is a central station, where is located a dynamo, D, electrically connected with sub-stations S and S' by main circuit 1 2. At each sub-station there is a series of cells of secondary battery, B and B'. Connected with each battery there is a working-circuit, $w$, containing a series of translating devices, as lamps 1, in number and character capable of absorbing only that amount and rate of current safely delivered by the battery when operating alone. At the terminals of each battery there is also connected a second working-circuit, $x$, containing a series of translating devices, as lamps 1, in number and character capable of absorbing only that amount and rate of current safely delivered by the dynamo when operating in connection with the battery. When only a portion of the lamps in circuits $w$ and $x$ are absorbing current, the battery supplies both circuits; but when the maximum rate of consumption is attained the dynamo must operate in conjunction with and supplementary to the battery, or else the battery may be injured by overdischarge.

If for any cause the dynamo-current cannot be supplied during the period of maximum consumption, it is necessary to limit the demand at the sub-station during the time the dynamo is unavailable. For this purpose I place an electro-magnetic switch, $m$, having contact-points $p$ $q$, in one lead of the working-circuit $x$. These contact-points are united by an artificial resistance, R. I run a special conductor, L, from the central station to all sub-stations in which the electro-magnetic switches $m$ are located. At the central station, C, there is a circuit-closer, $s$, and a battery, $b$, in the circuit L, and by closing switch $s$ the battery $b$ energizes the magnets $m$, and these in turn attract the normally-retracted armatures, thus opening the circuits $x$ at $q$; but immediately contact is made with stop $p$ the circuit $x$ is again closed through resistance R. This causes a drop in electro-motive force at the lamp-terminals sufficient only to produce a red glow, or to operate said lamps at a lower candle-power and relieve the battery of a portion of its surplus load. When the dynamo again comes into operative condition, the circuit L is broken and the parts resume their normal condition. In this way the direct system and the storage system co-operate and supplement each other, while each maintains an independence in respect to unavoidable accidents occurring to the other.

What I claim, and desire to secure by Letters Patent, is—

1. The combination of a dynamo-electric machine located at one station, a sub-station containing a series of cells of secondary battery, a charging-circuit uniting the central station with the sub-station, a working-circuit for the battery divided into two sections, an electro-magnetic switch for making and breaking one section of the working-circuit, and a special wire or circuit extending from the main station to the sub-station for operating said switch.

2. The combination of a dynamo-electric machine located at a central station, a secondary battery located at a sub-station, a charging-circuit uniting the dynamo and battery, a working-circuit for the sub-station connected with the battery, an electro-magnetic switch or circuit-changer at said sub-station to open the working-circuit and introduce an artificial resistance between the battery and lamps, and a special wire or circuit extending from the central station to the sub-station containing the coils of the said electro-magnetic circuit-changer.

Signed at New York, in the county of New York and State of New York, this 25th day of June, A. D. 1888.

ZACH LATSHAW.

Witnesses:
DANIEL E. DELAVAN,
WM. B. VANSIZE.